United States Patent [19]

Tsunooka et al.

[11] Patent Number: 6,148,904
[45] Date of Patent: Nov. 21, 2000

[54] AIR CONDITIONING APPARATUS FOR VEHICLE

[75] Inventors: Tatsuo Tsunooka, Kariya; Nobuyasu Naito, Iwakura; Hiroshi Kanda, Kariya; Takeshi Nakamura, Anjo, all of Japan

[73] Assignee: Denso Corporation, Kariya, Japan

[21] Appl. No.: 09/233,160

[22] Filed: Jan. 18, 1999

[30] Foreign Application Priority Data

Jan. 20, 1998 [JP] Japan .................................. 10-009041

[51] Int. Cl.[7] ...................................................... B60H 3/00
[52] U.S. Cl. .......................... 165/43; 165/204; 454/127; 454/161
[58] Field of Search ............................... 165/42, 43, 204; 454/127, 161; 237/123 A, 123 B

[56] References Cited

U.S. PATENT DOCUMENTS

| | | | |
|---|---|---|---|
| 5,012,859 | 5/1991 | Nakazawa et al. | 165/42 |
| 5,042,566 | 8/1991 | Hildebrand | 165/43 X |
| 5,176,201 | 1/1993 | Yamamoto | 165/42 X |
| 5,305,823 | 4/1994 | Elliot | 165/42 X |

FOREIGN PATENT DOCUMENTS 10114507  5/1989  Japan .
4-7019 Y2  2/1992  Japan .

*Primary Examiner*—Ira S. Lazarus
*Assistant Examiner*—Ljiljana V. Ciric
*Attorney, Agent, or Firm*—Harness, Dickey & Pierce, PLC

[57] ABSTRACT

In an air conditioning apparatus for a vehicle, a heater core is disposed in an air conditioning case so that a cool air bypass passage through which air bypasses the heater core is provided at an upper side of the heater core. When a foot/defroster mode is set, a defroster door for opening and closing a defroster opening is rotated to an intermediate position between a fully opening position and a fully closing position of the defroster opening. Therefore, a first air passage through which air from the cool air bypass passage flows into the defroster opening is provided between an inner wall portion of the air conditioning case and a top end of the defroster door. Further, a second air passage through which air from an air mixing chamber flows into the defroster opening is provided between an inner wall portion of the air conditioning case and a side end of the defroster door, and an amount of air passing through the second air passage is set to be larger than that of the first air passage. Thus, during the foot/defroster mode, temperature of air blown from the defroster opening can be improved.

9 Claims, 3 Drawing Sheets

AIR CONDITIONING APPARATUS FOR VEHICLE

CROSS-REFERENCE TO RELATED APPLICATION

This application is related to and claims priority from Japanese Patent Application No. Hei. 10-9041 filed on Jan. 20, 1998, the contents of which are hereby incorporated by reference.

BACKGROUND OF THE INVENTION

1. Field of the Invention

The present invention relates to an air conditioning apparatus for a vehicle, in which a temperature difference between air blown from a foot opening toward the foot portion of a passenger in a passenger compartment and air blown from a defroster opening toward a windshield is decreased during a foot/defroster mode where both the foot opening and the defroster opening are opened.

2. Description of Related Art

In a conventional air conditioning apparatus for a vehicle, an amount of air passing through a heating heat exchanger and an amount of air bypassing the heating heat exchanger are adjusted by an air mixing door so that a temperature of air blown into a passenger compartment is controlled. In the conventional air conditioning apparatus, a cool air bypass passage through which air bypasses the heating heat exchanger is provided at an upper side of the heating heat exchanger, a foot opening is provided at a lower side of an air conditioning case, and a face opening and a defroster opening are provided at an upper side of the air conditioning case. Because the defroster opening is provided at a downstream side of the cool air bypass passage, the temperature of air flowing into the defroster opening becomes greatly lower than the temperature of air flowing into the foot opening, during a foot/defroster mode. Thus, defrosting performance of a windshield is decreased.

SUMMARY OF THE INVENTION

In view of the foregoing problems, it is a first object of the present invention to provide an air conditioning apparatus for a vehicle, in which the temperature of air blown from a defroster opening is increased during an air outlet mode.

It is a second object of the present invention to provide an air conditioning apparatus for a vehicle in which the temperature of air blown from a defroster opening is readily increased using a simple way.

According to the present invention, an air conditioning apparatus for a vehicle includes an air conditioning case for forming an air passage and a heating heat exchanger. The heating heater exchanger is disposed in the air conditioning case so that a cool air bypass passage through which air bypasses the heating heat exchanger is provided at an upper side of the heating heat exchanger, and an air mixing chamber in which air from the cool air bypass passage and air from the heating heat exchanger are mixed is provided in the air conditioning case. In the air conditioning apparatus, a defroster door is rotated at an intermediate position between a fully opening position and a fully closing position of a defroster opening, during an air outlet mode where both the foot and defroster openings are opened. Therefore, a first air passage through which air from a cool air bypass passage flows into the defroster opening is formed between a top end of the defroster door and the air conditioning case. Further, a second air passage through which air from the air mixing chamber flows into the defroster opening is formed between a side end of the defroster door and the air conditioning case, and an amount of air flowing through the second air passage is larger than that of air flowing through the first air passage during the air outlet mode. Thus, during the air outlet mode, conditioned air in the air mixing chamber mainly flows into the defroster opening, and the amount of air flowing from the cool air bypass passage to the defroster opening can be reduced. As a result, the temperature of air blown from the defroster opening can be increased to a level near to the temperature of air blown from the foot opening, and defrosting performance of a windshield can be improved. Further, during a heating mode, it can prevent the temperature of air blown from the defroster opening from being extremely decreased, and heating performance of a passenger compartment can be improved.

Further, because the first air passage and the second air passage are respectively formed by the defroster door and the air conditioning case without using a special component, the temperature of air blown from the defroster opening is readily increased with a simple structure.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

A preferred embodiment of the present invention will be described hereinafter with reference to the accompanying drawings.

Figure 1:
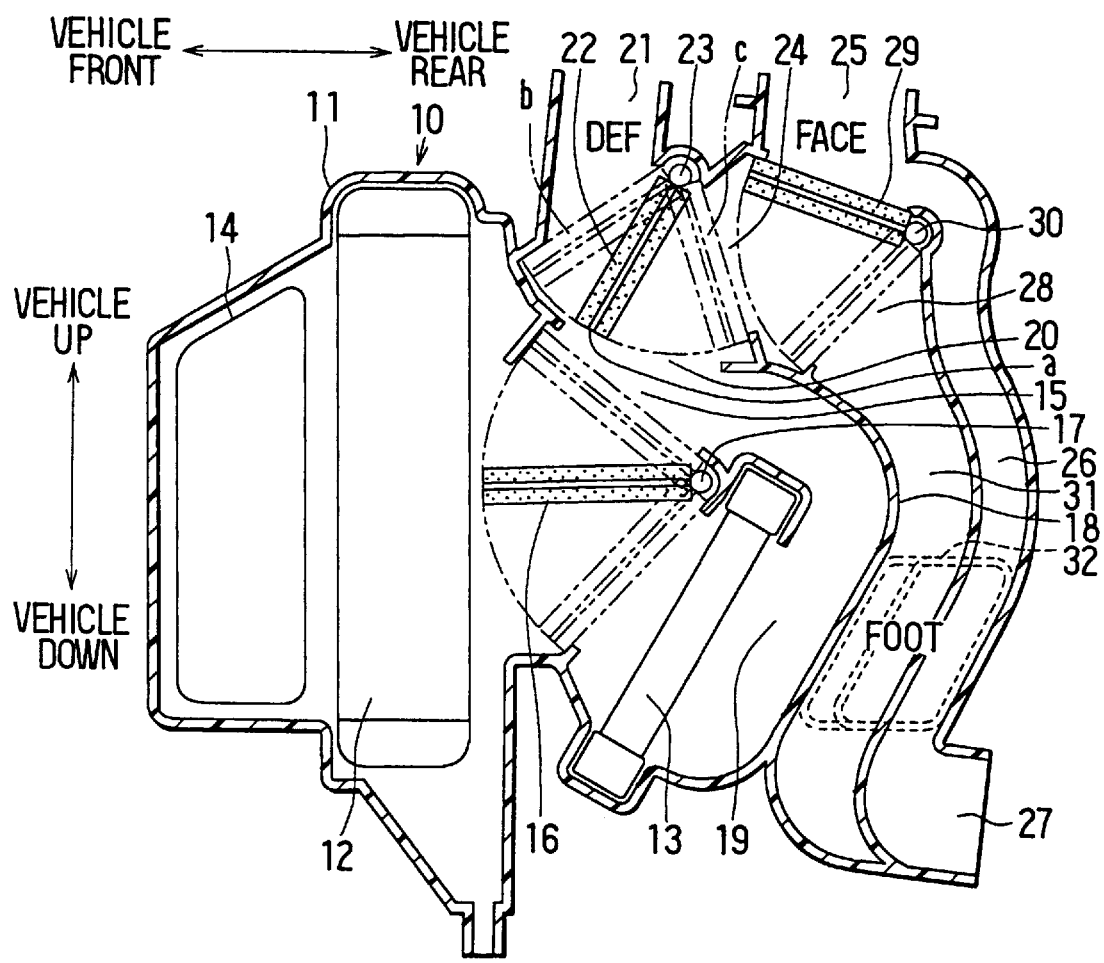
FIG. 1 is a schematic vertical sectional view showing a ventilation system of an air conditioning apparatus for a vehicle according to a preferred embodiment of the invention.

A ventilation system of an air conditioning apparatus for a vehicle includes a blower unit (not shown), and an air conditioning unit 10 shown in FIG. 1. The air conditioning unit 10 is disposed in a passenger compartment below an instrument panel at an approximate center in a right-left direction of the vehicle, and the blower unit is disposed in the passenger compartment at a side position shifted from the air conditioning unit 10 in the right-left direction.

The blower unit includes an inside/outside air switching box for introducing inside air (i.e., air inside the passenger compartment) and outside air (i.e., air outside the passenger compartment), and a blower for blowing air from the inside/outside air switching box into the passenger compartment.

In the air conditioning unit 10, both an evaporator (i.e., cooling heat exchanger) 12 and a heater core (i.e., heating heat exchanger) 13 are integrally accommodated within a common air conditioning case 11. The air conditioning case 11 is made of resin which has an elasticity to some degree and is superior in a strength, such as polypropylene, and is composed of a plurality of division cases. The plurality of division cases are integrally connected by a fastening member such as a metal spring clip and a screw, after the evaporator 12, the heater core 13 and components such as doors are accommodated therein, to construct the air conditioning unit 10.

The air conditioning unit 10 is disposed in the passenger compartment of the vehicle to correspond to an arrangement state in FIG. 1. As shown in FIG. 1, an air inlet 14 is provided at a most front side in the air conditioning case 11, and air blown from the blower unit flows into the air inlet 14 of the air conditioning unit 10. An evaporator 12 is disposed at a direct rear side of the air inlet 14 in a front-rear direction of the vehicle. The evaporator 12 is thin in the front-rear direction, and is disposed in the air conditioning case 11 to cross an entire air passage in an up-down direction of the vehicle. Thus, air from the air inlet 14 flows into a front surface of the evaporator 12 extending in the up-down direction. The evaporator 12 is for cooling air while absorbing an evaporation latent heat of refrigerant of a refrigerant cycle from air.

The heater core 13 is disposed in the air conditioning case 11 at a downstream side (vehicle rear side) of the evaporator 12 to have a predetermined distance therebetween. The heater core 13 is disposed at a lower side in the air conditioning case 11 so that an upper end of the heater core 13 is inclined toward a vehicle rear side. The heater core 13 heats air having passed through the evaporator 12 using hot water (engine cooling water) flowing therein.

A cool air bypass passage 15 through which air having passed through the evaporator 12 bypasses the heater core 13 is provided in the air conditioning case 11 at an upper side of the heater core 13. A plate-like air mixing door 16 is disposed between the heater core 13 and the evaporator 12 so that an amount of air passing through the heater core 13 and an amount of air passing through the cool air bypass passage 15 are adjusted. The air mixing door 16 is connected integrally with a rotation shaft 17 disposed horizontally, and is rotated in the up-down direction by the rotation shaft 17. By adjusting a rotation position of the air mixing door 16, the temperature of air blown into the passenger compartment can be adjusted.

The rotation shaft 17 of the air mixing door 16 is rotatably held in the air conditioning case 11. One end of the rotation shaft 17 protrudes from the air conditioning case 11 to the outside, and is connected to a manual operation member or an actuator using a servomotor through a link mechanism. Therefore, the rotation position of the air mixing door 16 is adjusted by the actuator or the manual operation member.

A wall portion 18 extending in the up-down direction is formed in the air conditioning case 11 integrally with the air conditioning case 11 at a downstream side of the heater core 13 to have a predetermined distance therebetween. In the air conditioning case 11, the wall portion 18 forms a warm air passage 19 extending upwardly from an immediately downstream side of the heater core 13. At an upper side of the heater core 13, the warm air passage 19 is joined with the cool air bypass passage 15, and an air mixing chamber 20 in which air from the warm air passage 19 and air from the cool air bypass passage 15 are mixed is formed in the joined portion.

A defroster opening 21 is provided in an upper surface of the air conditioning case 11 at a position adjacent to the cool air bypass passage 15 and the air mixing chamber 20. Therefore, air from the cool air bypass passage 15 and air from the air mixing chamber 20 can flow into the defroster opening 21. The defroster opening 21 is connected to a defroster air outlet for blowing air toward an inner surface of a windshield, through a defroster duct.

The defroster opening 21 is opened and closed by a plate-like defroster door 22. The defroster door 22 is rotated by a rotation shaft 23 disposed approximately horizontally at a position proximate to the upper surface of the air conditioning case 11. The rotation shaft 23 is disposed at a downstream position of an air flow from the cool air bypass passage 15 toward the air mixing chamber 20, and a top end 22a of the defroster door 22 is arranged at a position "a" in FIG. 1 to face toward an upstream side of the cool air bypass passage 15 during a foot/defroster mode.

When the defroster door 22 is rotated to chain line position "c" in FIG. 1, the defroster door 22 fully opens the defroster opening 21 and closes a communication port 24. Through the communication port 24, air from the air mixing chamber 20 flows into a face opening 25 and a foot opening 32. The face opening 25 is provided in the upper surface of the air conditioning case 11 at a vehicle rear side of the defroster opening 21. The face opening 25 is connected to a face air outlet through a face duct, and air is blown toward the head portion of a passenger in the passenger compartment from the face air outlet.

An upper end of a rear face passage 26 is connected to the face opening 25, a lower end 27 of the rear face passage 26 is connected to a rear face duct (not shown). The rear face duct is connected to a rear face air outlet through which air is blown toward the head portion of a passenger seated on a rear seat in the passenger compartment.

A foot air inlet 28 is provided at a vehicle rear side of the communication port 24 to be opposite to the face opening 25. A foot/face switching door 29 rotated by a rotation shaft 30 is disposed between the face opening 25 and the foot air inlet 28, so that the foot air inlet 28 and the face opening 25 are opened and closed by the foot/face switching door 29.

a foot air passage 31 is provided at a vehicle rear side of the wall portion 31, and the rear face air passage 26 is provided at a vehicle rear side of the foot air passage 31. An upper end of the foot air passage 31 is connected to the foot air inlet 28, and a front foot opening 32 is provided at a midway position of the foot air passage 31. Air from the front foot opening 32 is blown toward the foot portion of a passenger seated on a front seat in the passenger compartment through a front foot duct and a foot air outlet.

An opening end formed at a lower position of the foot air passage 31 is connected to a rear foot air outlet through a rear foot duct so that air is blown toward the foot portion of the passenger seated on the rear seat in the passenger compartment. The defroster door 22 and the foot/face switching door 29 are connected to a manual operation member or an actuator such as a servomotor through a link mechanism, and are operatively linked with each other by the manual operation member or the actuator.

Figure 2:
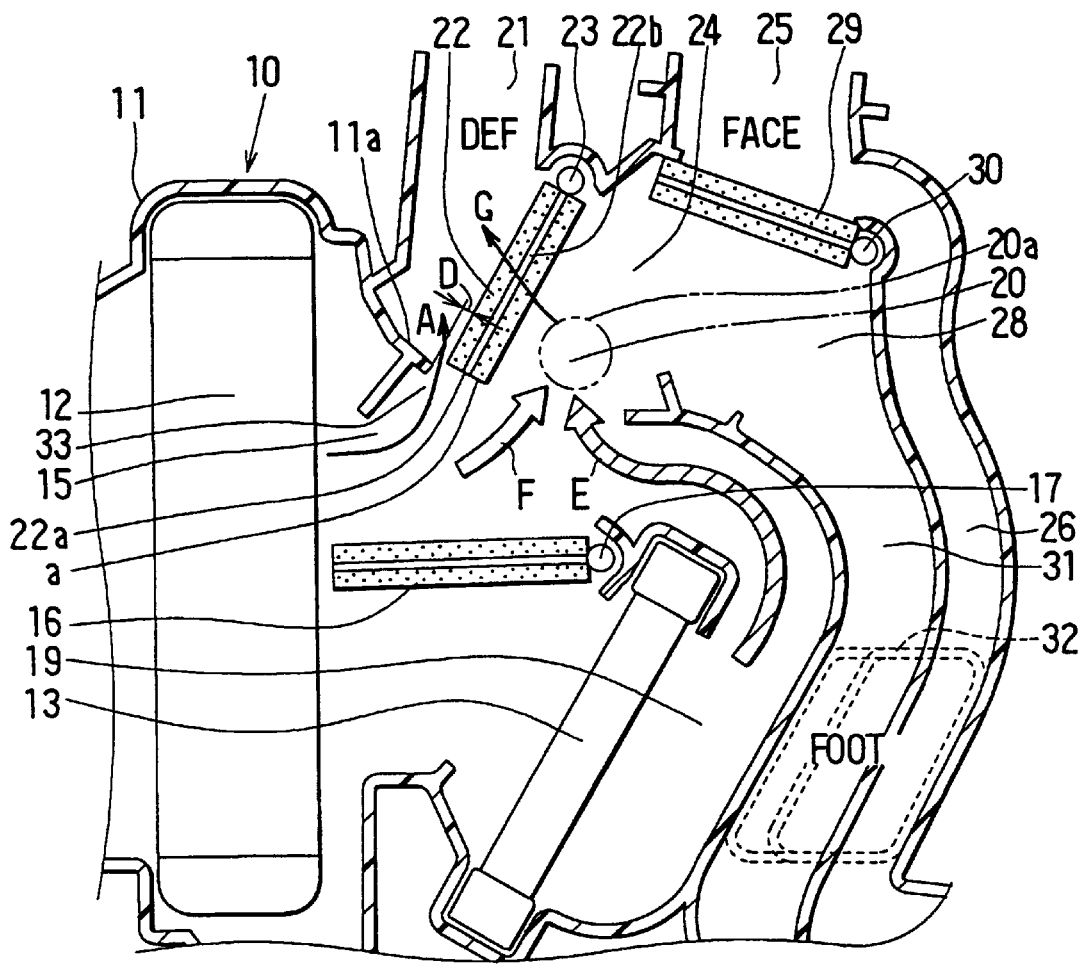
FIG. 2 is an enlarged sectional view showing a part of the ventilation system in FIG. 1.
Figure 3:
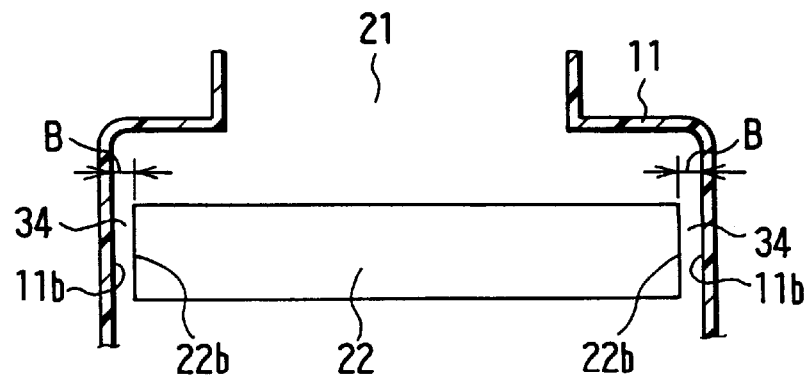
FIG. 3 is a transverse sectional view showing an arrangement state of a defroster door.

FIGS. 2 and 3 show a position of the defroster door 22 during the foot/defroster mode in which both the defroster opening 21 and the foot opening 32 are opened. During the foot/defroster mode, the defroster door 22 is rotated to an intermediate position "a" in FIG. 1 between a fully opening position of the defroster opening 21 and a fully closing position of the defroster opening 21. When the defroster door 22 is rotated at the intermediate position "a", the top end 22a of the defroster door 22 is positioned to be proximate to an inner wall portion 11a of the air conditioning case 11, so that a small clearance D is provided between a door surface of the defroster door 22 and the inner wall portion 11a as shown in FIG. 2. The inner wall portion 11a protrudes to an inner side of the air conditioning case 11. In the foot/defroster mode, the foot/face switching door 29 fully closes the face opening 25 and fully opens the foot air inlet 28.

As shown in FIG. 2, a first air passage 33 through which air from the cool air bypass passage 15 flows into the defroster opening 21 as shown by arrow A in FIG. 2 is provided between the top end 22a of the defroster door 22 and the inner wall portion 11a of the air conditioning case 11. Further, a predetermined clearance B shown in FIG. 3 is provided between an inner wall portion 11b of the air conditioning case 11 and each side end 22b of the defroster door 22 in a width direction of the vehicle, and a second air passage 34 is formed by the clearance B. Because the clearance B is provided at both sides of the side ends 22b of the defroster door 22 in the width direction, both the second air passages 34 are also provided at both sides of the side ends 22b of the defroster door 22 in the width direction. Through both the second air passages 34, air from the air mixing chamber 20 flows into the defroster opening 21 as shown by arrow G in FIG. 2. In the embodiment, a passage sectional area of the first air passage 33 is set to be smaller than a total passage sectional area of the second air passages 34. For example, the clearance D between the top end 22a of the defroster door 22 and the inner wall portion 11a of the air conditioning case 11 is set to 5 mm, the clearance B between each side end 22b of the defroster door 22 and the inner wall portion 11b of the air conditioning case 11 is set to 12 mm. Further, in the embodiment, the passage sectional area of the first air passage 33 is set to 20%, each passage sectional area of both the second air passages 34 is set to 40%. That is, the total passage sectional area of both the second air passages 34 is set to 80%.

According to the embodiment of the present invention, when the foot/defroster mode is set, the defroster door 22 is rotated to the intermediate position "a" proximate to the inner wall portion 11a of the air conditioning case 11, an air mixing area 20a of the air mixing chamber 20 is formed at a back surface side of the defroster door 22 relative to the defroster opening 21.

Next, operation of the air conditioning apparatus according to the embodiment of the present invention will be now described.

(1) FACE MODE

When the face mode is set, the defroster door 22 is rotated to the chain line position "b" in FIG. 1 to close the defroster opening portion 21 and to fully open the communication port 24. Further, the foot/face switching door 29 is rotated to the chain line position in FIG. 1 to close the foot air inlet 28. Thus, air blown by the blower unit passes through the evaporator 12, flows into the face opening 25 and the rear face air passage 26, and is blown toward an upper side of the passenger compartment.

(2) BI-LEVEL MODE

When the bi-level mode is set, the defroster door 22 is rotated to the chain line position "b" in FIG. 1 to close the defroster opening 21 and to fully open the communication port 24. Further, the foot/face switching door 29 is rotated to the intermediate position between the solid line position and the chain line position in FIG. 1 so that both the face opening 25 and the foot air inlet 28 are opened. Thus, air from the blower unit is blown toward the head portion of a passenger through the face opening 25 and the rear face air passage 26, while being blown toward the foot area of the passenger through the foot air passage 31 and the foot opening 32.

(3) FOOT/DEFROSTER MODE

FIG. 2 shows a state of the foot/defroster mode. When the foot/defroster mode is set, the foot/face switching door 29 is rotated to the solid line position so that the face opening 25 and the rear face air passage 26 are closed and the foot air inlet 28 is fully opened. On the other hand, the defroster door 22 is rotated to the intermediate position "a" in FIG. 2 so that the top end 22a of the defroster door 22 is plated at a position proximate to the inner wall portion 11a of the air conditioning case 11. Therefore, the communication port 24 is approximately fully opened.

During the foot/defroster mode, because the defroster opening 21 communicates with the cool air bypass passage 15 through the first air passage 33, air in the cool air bypass passage 15 flows into the defroster opening 21 through the first air passage 33 as shown by arrow A in FIG. 2. Further, because the defroster opening 21 communicates with the air mixing chamber 20 through both the second air passages 34 at both side of the side end portions 22b of the defroster door 22, air in the air mixing chamber 20 flows into the defroster opening 21 as shown by arrow G in FIG. 2.

In the foot/defroster mode, the air mixing door 16 is rotated to an intermediate position so that warm air E from the warm air passage 19 and cool air F from the cool air bypass passage 15 are mixed in the air mixing area 20a of the air mixing chamber 20 to have a predetermined temperature. The conditioned air having the predetermined temperature is blown toward the foot portion of the passenger through the foot air inlet 28 and the foot opening 32. A part of air in the air mixing area 20a of the air mixing chamber 20 flows into the defroster opening 21 through the both second air passages 34 as shown by arrow G in FIG. 2. According to the embodiment of the present invention, because the total passage sectional area of the second air passages 34 is set to be greatly larger than the passage sectional area of the first air passage 33 (e.g., four times), the temperature of air blown from the defroster opening 21 can be increased to be near to the temperature of air blown from the foot opening 32. Thus, during the foot/defroster mode, it can prevent the temperature of air blown from the defroster opening 21 is greatly lowered as compared with the temperature of air blown from the foot opening 32, and both defroster performance of the windshield and heating performance of the passenger compartment can be improved.

(3) FOOT MODE

When the foot mode is set, the foot/face switching door 29 is rotated to the solid line position so that the face opening 25 is closed and the foot air inlet 28 is fully opened. On the other hand, the defroster door 22 is rotated clockwise from the position in FIG. 2 by a predetermined angle so that the top end 22a of the defroster door 22 is positioned at an inner side of the inner wall portion 11a of the air conditioning case 11. Although the first air passage 33 composed of a very small clearance is formed between the top end 22a of the defroster door 22 and the inner wall portion 11a of the air conditioning case 11, air flow resistance of the first air passage 33 becomes larger as compared with the foot/defroster mode. Therefore, the amount of air flowing from the cool air bypass passage 15 into the defroster opening 21 becomes smaller in the foot mode. Thus, the temperature of air blown from the defroster opening 21 is near to the temperature of air blown from the foot opening 32 and the foot air passage 31. During the foot mode, the amount of air blown from the defroster opening 21 is decreased as compared with the foot/defroster mode.

(5) DEFROSTER MODE

When the defroster mode is set, the defroster door 22 is rotated to the chain line position "c" in FIG. 1 so that the defroster opening 21 is fully opened and the communication port 24 is closed. Therefore, most of air blown from the blower unit flows into the defroster opening 21 from the air mixing chamber 20, and is blown toward an inner surface of a front windshield. Simultaneously, a part of air passes through right and left side face openings from the air mixing chamber 20, and is blown toward side windshields of the vehicle.

Although the present invention has been fully described in connection with the preferred embodiment thereof with reference to the accompanying drawings, it is to be noted that various changes and modifications will become apparent to those skilled in the art.

For example, in the above-described embodiment, the clearance B is provided at both sides of the side ends 22b of the defroster door 22 as shown in FIG. 3. However, only a clearance having a sufficient passage sectional area may be provided between the inner wall portion 11b and one of the side ends 22b of the defroster door 22.

Figure 4:
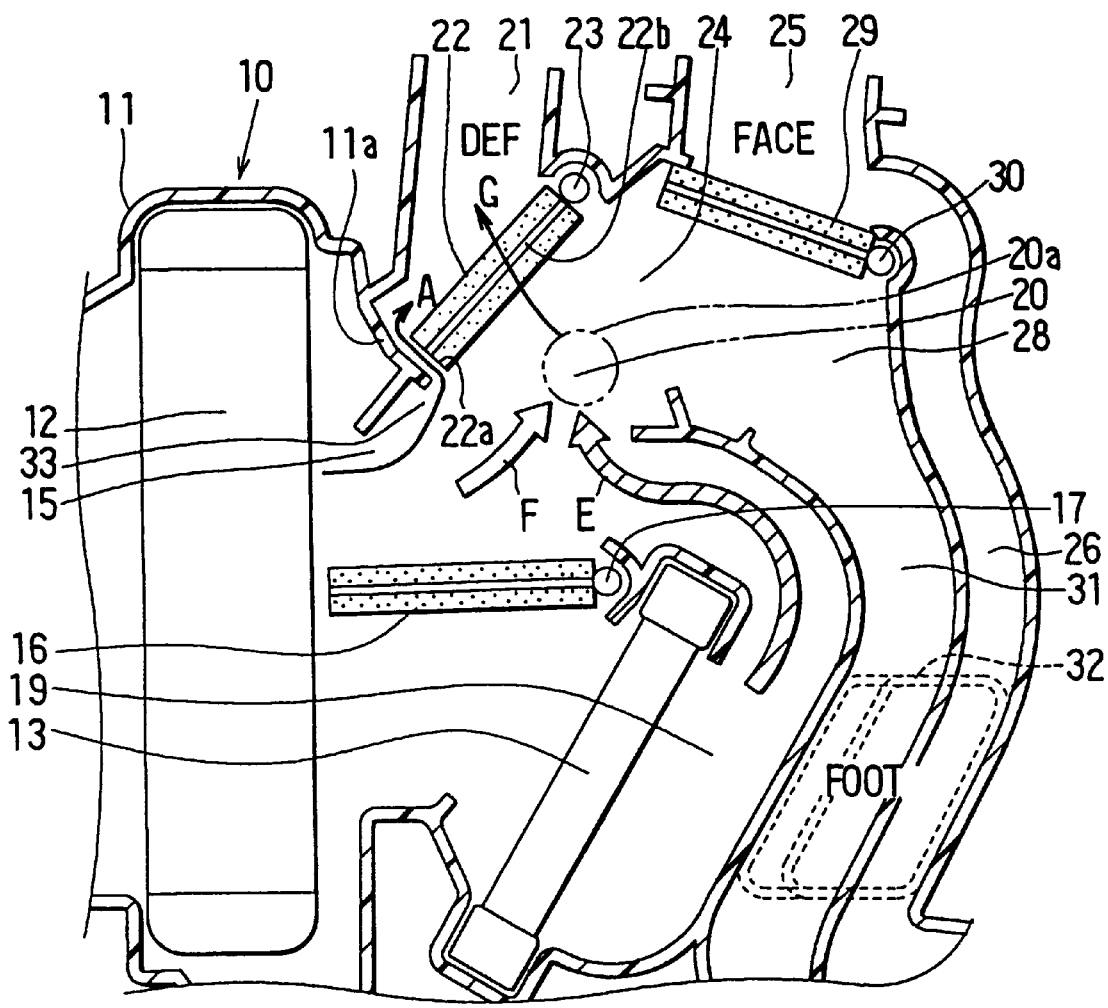
FIG. 4 is a sectional view showing a part of a ventilation system of an air conditioning apparatus for a vehicle according to a modification of the embodiment.

In the above-described embodiment, when the foot/defroster mode is set, the defroster door 22 is rotated to the intermediate position "a" so that the small clearance D is provided between the door surface of the defroster door 22 and the inner wall portion 11a as shown in FIG. 2. However, when the foot/defroster mode is set, the defroster door 22 may be rotated to the position shown in FIG. 4. That is, the top end 22a of defroster door 22 may be overlapped with the inner wall portion 11a in the front-rear direction of the vehicle. In this case, the first air passage 33 through which air from the cool air bypass passage 15 flows into the defroster opening 21 as shown by arrow A in FIG. 4 is also provided between the top end 22a of the defroster door 22 and the inner wall portion 11a of the air conditioning case 11.

Such changes and modifications are to be understood as being within the scope of the present invention as defined by the appended claims.

What is claimed is:

1. An air conditioning apparatus for a vehicle having a passenger compartment, said air conditioning apparatus comprising:
   an air conditioning case having a first opening for blowing air toward a lower side of the passenger compartment and a second opening for blowing air toward an inner surface of a windshield;
   a heating heat exchanger for heating air passing therethrough, said heating heat exchanger being disposed at a lower side of said air conditioning case so that a cool air bypass passage through which air bypasses said heating heat exchanger is formed at an upper side of said heating heat exchanger;
   an air mixing door for adjusting an amount of air passing through said heating heat exchanger and an amount of air passing through said cool air bypass passage; and
   a mode door for opening and closing said second opening, said mode door having a rotation shaft, a top end opposite to said rotation shaft and a side end, wherein:
   said air conditioning case has an air mixing chamber in which air from said cool air bypass passage and air from said heating heat exchanger are mixed at an upper side of said air conditioning case;
   said mode door is rotatable to an intermediate position during an air outlet mode where both said first and second openings are opened, said mode door defining a first air passage between said top end of said mode door and said air conditioning case as well as a second air passage between said side end of said mode door and said air conditioning case, said second air passage having a larger sectional area than the sectional area of said first air passage;
   said air conditioning case has a wall portion protruding to an inner side of said air conditioning case;
   said first air passage is formed a first clearance between said top end of said mode door and said protrusion wall portion and said second air passage is formed by a second clearance between said side end of said mode door and said air conditioning case; and
   said first clearance is smaller than said second clearance.

2. The air conditioning apparatus according to claim 1, wherein:
   said first opening is provided in said air conditioning case in such a manner that air from said air mixing chamber flows into said first opening; and
   said second opening is provided in said air conditioning case on an upper side at a position adjacent to said cool air bypass passage and said air mixing chamber.

3. The air conditioning apparatus according to claim 1, wherein:
   said air conditioning case has a third opening for blowing air toward an upper side of the passenger compartment, said third opening being provided on the upper side of said air conditioning case at a vehicle rear side of said second opening;
   said air conditioning case has a communication port provided at an upstream side of said first opening and said third opening, said communication port communicating with said air mixing chamber at a downstream side of said air mixing chamber; and
   said mode door is operable to open and close said communication port.

4. An air conditioning apparatus for a vehicle having a passenger compartment, said air conditioning apparatus comprising:
   an air conditioning case having a first opening for blowing air toward a lower side of the passenger compartment and a second opening for blowing air toward an inner surface of a windshield;
   a heating heat exchanger for heating air passing therethrough, said heating heat exchanger being disposed at a lower side of said air conditioning case so that a cool air bypass passage through which air bypasses said heating heat exchanger is formed at an upper side of said heating heat exchanger;
   an air mixing door for adjusting an amount of air passing through said heating heat exchanger and an amount of air passing through said cool air bypass passage; and
   a mode door for opening and closing said second opening, said mode door having a rotation shaft, a top end opposite to said rotation shaft and a side end, wherein:
   said air conditioning case has an air mixing chamber in which air from said cool air bypass passage and air from said heating heat exchanger are mixed at an upper side in said air conditioning case;
   said mode door is rotatable to an intermediate position during an air outlet mode where both said first and second openings are opened, said mode door defining a first air passage between said top end of said mode door and said air conditioning case as well as a second air passage between said side end of said mode door and said air conditioning case, said second air passage having a larger sectional area than the sectional area of said first air passage;
   said side end of said mode door has first and second side end portions in a width direction of said mode door;

said case has first and second inner wall portions in the width direction at positions corresponding to said first and second side end portions of said mode door; and said second air passage is formed between said first side end portion of said mode door and said first inner wall portion, as well as between said second side end portion of said mode door and said second inner wall portion.

5. The air conditioning apparatus according to claim 4, wherein:

said first opening is provided in said air conditioning case in such a manner that air from said air mixing chamber flows into said first opening; and said second opening is provided in said air conditioning case on an upper side at a position adjacent to said cool air bypass passage and said air mixing chamber.

6. The air conditioning apparatus according to claim 4, wherein:

said air conditioning case has a third opening for blowing air toward an upper side of the passenger compartment, said third opening being provided on the upper side of said air conditioning case at a vehicle rear side of said second opening;

said air conditioning case has a communication port provided at an upstream side of said first opening and said third opening, said communication port communicating with said air mixing chamber at a downstream side of said air mixing chamber; and said mode door is operable to open and close said communication port.

7. An air conditioning apparatus for a vehicle having a passenger compartment, said air conditioning apparatus comprising:

an air conditioning case having a first opening for blowing air toward a lower side of the passenger compartment and a second opening for blowing air toward an inner surface of a windshield;

a heating heat exchanger for heating air passing therethrough, said heating heat exchanger being disposed of said air conditioning case at a lower side so that a cool air bypass passage through which air bypasses said heating heat exchanger is formed at an upper side of said heating heat exchanger;

an air mixing door for adjusting an amount of air passing through said heating heat exchanger and an amount of air passing through said cool air bypass passage; and a mode door for opening and closing said second opening, said mode door having a rotation shaft a top end opposite to said rotation shaft and a side end, wherein:

said air conditioning case has an air mixing chamber in which air from said cool air bypass passage and air from said heating heat exchanger are mixed at an upper side in said air conditioning case;

said mode door is rotatable to an intermediate position during an air outlet mode where both said first and second openings are opened, said mode door defining a first air passage between said top end of said mode door and said air conditioning case as well as a second air passage between said side end of said mode door and said air conditioning case, said second air passage having a larger sectional area than the sectional are of said first air passage;

said mode door is disposed in said air conditioning case in such a manner that said rotation shaft is arranged at a downstream position of an air flow from said cool air bypass passage toward said air mixing chamber, and said top end of said mode door is disposed toward an upstream side of said air flow during said air outlet mode.

8. The air conditioning apparatus according to claim 7, wherein:

said first opening is provided in said air conditioning case in such a manner that air from said air mixing chamber flows into said first opening; and said second opening is provided in said air conditioning case on an upper side at a position adjacent to said cool air bypass passage and said air mixing chamber.

9. The air conditioning apparatus according to claim 7, wherein:

said air conditioning case has a third opening for blowing air toward an upper side of the passenger compartment, said third opening being provided on the upper side of said air conditioning case at a vehicle rear side of said second opening;

said air conditioning case has a communication port provided at an upstream side of said first opening and said third opening, said communication port communicating with said air mixing chamber at a downstream side of said air mixing chamber; and said mode door is operable to open and close said communication port.

* * * * *